United States Patent [19]

Lerma, Jr.

[11] Patent Number: 4,862,792
[45] Date of Patent: Sep. 5, 1989

[54] BARBECUE GRILLE WITH SWING-OUT FOOD AND FUEL SUPPORTING GRATES

[76] Inventor: Demetrio Lerma, Jr., Rte. #1, Box 407, Abilene, Tex. 79601

[21] Appl. No.: 205,193

[22] Filed: Jun. 10, 1988

[51] Int. Cl.$^4$ ............................................. A47J 37/08
[52] U.S. Cl. ..................... 99/401; 126/340; 126/9 R; 99/448; 99/393; 99/402
[58] Field of Search ................ 99/448, 339, 357, 393, 99/395, 399, 401, 402, 423, 424, 443 R; 126/9 R, 9 B, 300, 301, 307 R, 315, 314, 316, 318, 340, 505, 506, 540, 541

[56] References Cited

U.S. PATENT DOCUMENTS

| 195,383 | 9/1877 | Montross | 126/340 |
|---|---|---|---|
| 366,733 | 7/1887 | Millett | 126/340 |
| 456,000 | 7/1891 | Graves | 126/340 |
| 649,135 | 5/1900 | Millett | 126/340 |
| 762,401 | 6/1904 | Hall | 99/401 |
| 839,581 | 12/1906 | Harman | 126/340 |
| 872,353 | 12/1907 | Konst | 126/340 |
| 1,116,431 | 11/1914 | Jaglowitz | 126/340 |
| 1,632,719 | 6/1927 | White | 126/340 |
| 2,611,357 | 9/1952 | Turner | 126/25 |
| 2,682,263 | 6/1954 | Brodbeck | 126/340 X |
| 2,721,546 | 10/1955 | Patrick | 126/9 R X |
| 2,798,476 | 7/1957 | Marion, Jr. | 126/9 R |
| 2,827,846 | 3/1958 | Karkling | 126/506 X |
| 2,902,026 | 9/1959 | Hawthorn, Jr. | 126/25 |
| 3,088,395 | 5/1963 | Miller | 99/340 |
| 3,151,609 | 10/1964 | Hastings, Jr. | 126/25 |
| 3,306,280 | 2/1967 | Vannoy | 126/25 |
| 3,375,775 | 4/1968 | Folmar | 99/401 X |
| 3,477,360 | 11/1969 | Raney | 99/339 |
| 4,069,806 | 1/1978 | Landry | 126/9 |
| 4,418,678 | 12/1983 | Erickson | 126/9 |
| 4,646,716 | 3/1987 | Love | 126/541 X |
| 4,706,817 | 11/1987 | Greathouse | 126/9 B X |

FOREIGN PATENT DOCUMENTS

| 37392 | 5/1886 | Fed. Rep. of Germany | 126/9 R |
|---|---|---|---|
| 481819 | 1/1917 | France | 126/9 R |

Primary Examiner—Stephen Marcus
Assistant Examiner—Christine A. Peterson
Attorney, Agent, or Firm—Hubbard, Thurman, Turner & Tucker

[57] ABSTRACT

The elevated, open-topped housing of a solid fuel-burning barbecue grille is provided with a hinged top lid and upper and lower swing-out doors which respectively carry horizontally disposed food and solid fuel-supporting grate structures that are moved out of and into the housing interior, through framed housing side wall openings, as the doors are opened and closed, thereby permitting food items to be placed on the upper grate, and charcoal to be placed on the lower grate, externally of the housing and without lifting the housing lid. To prevent cooking heat escape from the housing interior when the upper door is opened, a hinged flap automatically pivots downwardly to cover the upper door opening when the upper door is opened. When the upper door is closed, an interior tab member theaid vent pipe in a selected one of said open and closed positions thereof.

19 Claims, 3 Drawing Sheets

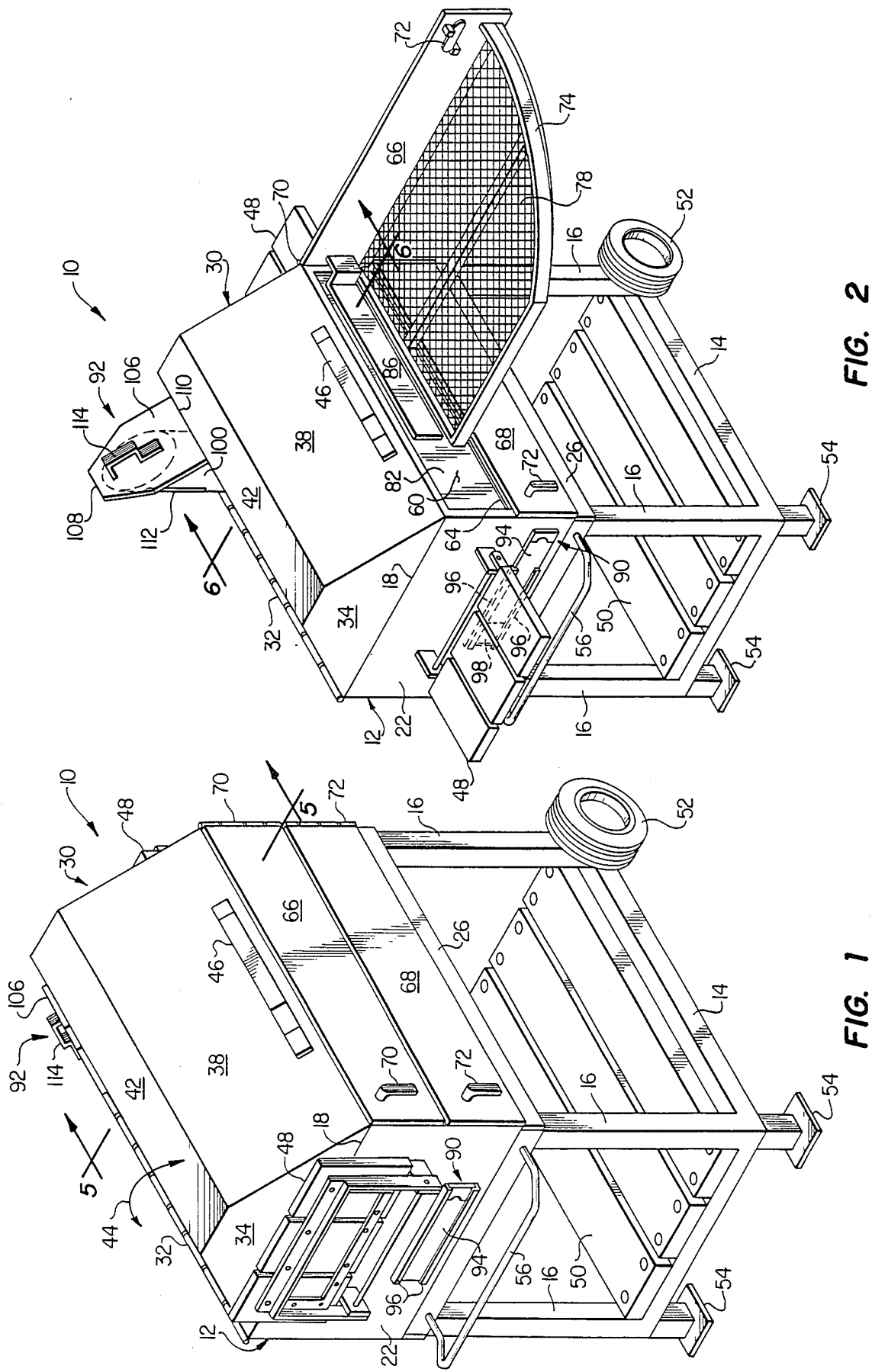

4,862,792

BARBECUE GRILLE WITH SWING-OUT FOOD AND FUEL SUPPORTING GRATES

BACKGROUND OF THE INVENTION

The present invention relates generally to outdoor cooking apparatus and, in a preferred embodiment thereof, more particularly provides an improved barbecue grille having separate swing-out food and solid fuel-supporting grate structures, a popup flue, and a variety of other useful and convenient features.

Outdoor barbecue grilles using charcoal or wood as a cooking fuel are widely used and quite popular. In a typical construction thereof, the conventional barbecue grille has an elevated, leg-supported housing with a top opening coverable with a removable lid. A charcoal grate is removably supportable within a lower portion of the housing, and a food supporting grate is removably supportable within the housing adjacent its open upper end which snugly receives the lid. The two grates are installed by dropping them into the housing, and they are typically supported in the housing by circumferentially spaced series of upper and lower internal support tabs. The grates may be removed from the housing by lifting them outwardly through the open upper housing end. With the lid in place directly over the food supporting grate, adjustable combustion draft control is provided by small slide damper structures operatively positioned on the lid and in the housing beneath the fuel supporting grate.

To prepare for cooking, the fuel supporting grate is dropped into place and a suitable quantity of charcoal is arranged in a mound on a central portion of the grate. The mounded charcoal is then doused with starting fluid and lit. When the resulting flame has died down, and the charcoal pieces have turned white, the burning charcoal is spread in an even layer on the fuel supporting grate. The upper food supporting grate is then dropped into place, the food items are placed thereon, and the lid is placed over the open upper housing end to begin the cooking process.

Several well known problems, limitations and disadvantages are typically associated with conventional barbecue grilles of this general type. For example, charcoal ash tends to fall downwardly through the lower housing vent openings beneath the fuel supporting grate and is usually blown around the yard — even when an ash-catching plate member is positioned beneath the lower vent openings. Additionally, if the lid's vent openings are not closed after using the grille they readily permit rain or sprinkler water to fall into the housing, thereby accelerating rusting of its interior and causing residual ash therein to cake in a difficult to clean mass.

Another problem, quite familiar to backyard cooking enthusiasts, arises when it becomes time to lift the housing lid and turn and/or rearrange the cooking food items on the upper grate. To accomplish this task it is often necessary for the cook to place his hand directly over the upper grate, and thereby over the often intense rising heat from the burning fuel — even when using an elongated turning fork or the like. Additionally, particularly when greasy food such as pork is being cooked, lifting the lid often causes "flame up" which can burn both the food and the cook.

Finally, particularly when large roasts, or other items requiring lengthy cooking times, are being prepared it is usually necessary to periodically add additional charcoal during the cooking process. With conventional barbecue grilles of the general type described, the cook has two charcoal-adding options — neither of which is particularly desirable or efficient. First, he can simply remove the upper grate and the food items thereon, find a suitable area upon which to temporarily support the hot grate and the usually dripping food, appropriately position additional charcoal on the burning layer thereof, and then drop the upper grate and its supported food back into the housing. The inconvenience of this procedure is readily apparent. Alternatively, the cook can drop additional charcoal chunks, one-by-one, through enlarged peripheral openings often formed in the upper grate for just this purpose. However, as might be imagined, it is quite difficult to position a piece of charcoal beneath a central portion of the upper grate by dropping it through a peripheral edge portion thereof.

In view of the foregoing, it is accordingly an object of the present invention to provide a solid fuel-burning barbecue grille which eliminates or minimizes the above-mentioned an other problems, limitations and disadvantages commonly associated with conventional barbecue grilles of the general type described.

SUMMARY OF THE INVENTION

In carrying out principles of the present invention, in accordance with a preferred embodiment thereof, an improved solid fuel-burning barbecue grille is provided which comprises an open-topped, elongated rectangular housing having a base wall, a pair of horizontally elongated, opposite front and rear side walls and a pair of opposite end walls. A lid section is hingedly connected to the upper edge of the rear housing side wall and has a pair of upwardly and inwardly sloped opposite front and rear side walls.

The housing and it pivotally connected lid are held in an elevated position by vertical support legs secured at their lower ends to a wheel-supported base frame and shelf structure, thereby permitting the grille to be easily rolled from place to place. A pair of swing-down shelves are operatively secured to the opposite end walls of the housing and, together with the base shelf, form convenient food and equipment support and storage areas.

Framed upper and lower horizontally elongated openings are formed through the front side wall of the housing and may be selectively covered and uncovered by upper and lower swing-out doors hinged to the housing for pivotal movement about vertical axes. Horizontally disposed upper and lower support frame structures are respectively secured to the inner sides of the upper and lower doors. Each of these support frames is configured to be swung inwardly into the housing interior, through its associated housing opening, when its door is closed, and to be swung outwardly from the housing when its door is opened. A lift-out food supporting grate is removably supported in the upper support frame for pivotal movement therewith into and out of the housing, and a lift-out solid fuel supporting grate is removably carried within the lower support frame for pivotal movement therewith into and out of the housing.

To use the grille the lower door is opened and charcoal (or other solid fuel such as wood) is placed on the fuel grate and is then lit in the usual manner. When the charcoal is suitably ignited, or after its initial "burn-down" period, the lower door is closed to position the charcoal within the housing somewhat above its base wall. Alternatively, the charcoal may be ignited within the housing after the lower door has been closed.

After the charcoal is ready for cooking, the upper door is opened to swing the food grate outwardly through the upper front sidewall opening of the housing and conveniently position the food grate in a loading position in front of the housing. Food items to be cooked may then be rather leisurely placed and arranged on the food grate since it is no longer positioned over the burning charcoal, and the cook's hand is accordingly not subjected to such heat.

With the top housing door fully opened, a hinged flap within the housing automatically drops downwardly over the upper housing sidewall opening to prevent cooking heat from escaping forwardly therethrough. When the upper door is closed to position the food items over the burning charcoal within the housing, a tab member interiorly secured to the hinged end of the upper door engages the flap, pivots it inwardly into the housing and holds the flap in an open position during cooking.

During cooking, with the housing lid in its closed position over the top housing opening, fuel combustion draft control is provided by means of an air inlet slide damper structures position on the end walls of the housing at a level lower than that of the fuel support grate positioned therein. Combustion air passing inwardly through the slide dampers flows beneath and then upwardly through the burning charcoal, and then exits the housing through a specially designed pop-up flue structure positioned on the housing lid.

The flue structure includes a vertically disposed tubular metal vent pipe slidably received in a circular opening formed vertically through the sloping rear side wall of the housing lid. The upper end of the vent pipe is secured to and closed by a closure plate which projects outwardly beyond the upper end periphery of the vent pipe and is horizontally sloped at an angle substantially identical to the slope angle of the rear side wall of the housing lid, the closure plate having opposite upper and lower side edges. An outlet opening is formed radially through the vent pipe immediately below the upper side edge of the closure plate, and the closure plate has a pull handle secured to its upper side surface.

In its closed position the vent pipe extends downwardly into the lid interior, through the circular opening in the lid, and is received within a tubular, expanded metal support sleeve interiorly depending from the lid around its circular opening. The vent pipe radial outlet opening is positioned within the lid interior, and the closure plate is parallel to and abuts the exterior surface of the rear lid side wall with the lower side edge of the closure plate being disposed rearwardly of its upper side edge.

From this closed position, the vent pipe may be quickly "popped up" to its operative position, to form a combustion gas outlet for the grille, by simply grasping the closure plate handle and pulling the vent pipe upwardly, rotating the vent pipe 180° in either direction about its longitudinal axis, and then lowering the pipe so that the lower side edge of the closure plate engages the rear side wall of the lid. The now forwardly facing lower side edge of the closure plate, by its engagement with the housing lid, functions to hold the vent pipe in an upwardly telescoped position with its outlet opening facing rearwardly and positioned above the exterior surface of the rear side wall of the lid.

During cooking, with the vent pipe held in this manner in its upwardly extended position, rising combustion gas from with the housing passes inwardly through an expanded metal lower end section of the vent pipe, upwardly through the pipe, and rearwardly through the horizontally facing outlet opening in its upper end. When the cooking is completed, the vent pipe is simply lifted a short distance, rotated 180°, and then dropped back to its fully retracted closed position.

The barbecue grille of the present invention provides a variety of advantages over conventional solid fuel-burning grilles. For example, since the air inlet dampers are positioned on vertical end walls of the housing, fuel ash does not fall through the inlet onto the ground. Instead, the ash falls upon the interior surface of the housing base wall, thereby captively retaining essentially all of the ash conveniently within the housing beneath the fuel grate. Additionally, since the vent pipe outlet opening faces horizontally (instead of upwardly), rain or sprinkler water entry therethrough into the housing is significantly reduced.

Also, as previously mentioned, since the food grate can be swung outwardly from the housing and away from the hot charcoal, the cooking food items can be periodically turned and rearranged without subjecting the cook's hands to searing charcoal heat. Moreover, the housing lid need not be lifted to turn or reposition the food on its support grate. Accordingly, fuel "flame up" is substantially eliminated.

Finally, when an extended cooking period (i.e., a period beyond that of the initial charcoal batch) is required, additional charcoal may be added to any selected section of the fuel grate, without moving the food grate, simply by opening the lower housing door to provide complete, unimpeded access to the fuel grate and the charcoal thereon.

BRIEF DESCRIPTION OF THE DRAWINGS

FIG. 1 is a perspective view of a solid fuel-burning barbecue grille which embodies principles of the present invention;

FIG. 2 is a reduced scale perspective view of the grille with shelf and flue portions thereof moved to their operative positions, and an upper food grate-supporting door swung out to its open position;

DETAILED DESCRIPTION

Figure 3:
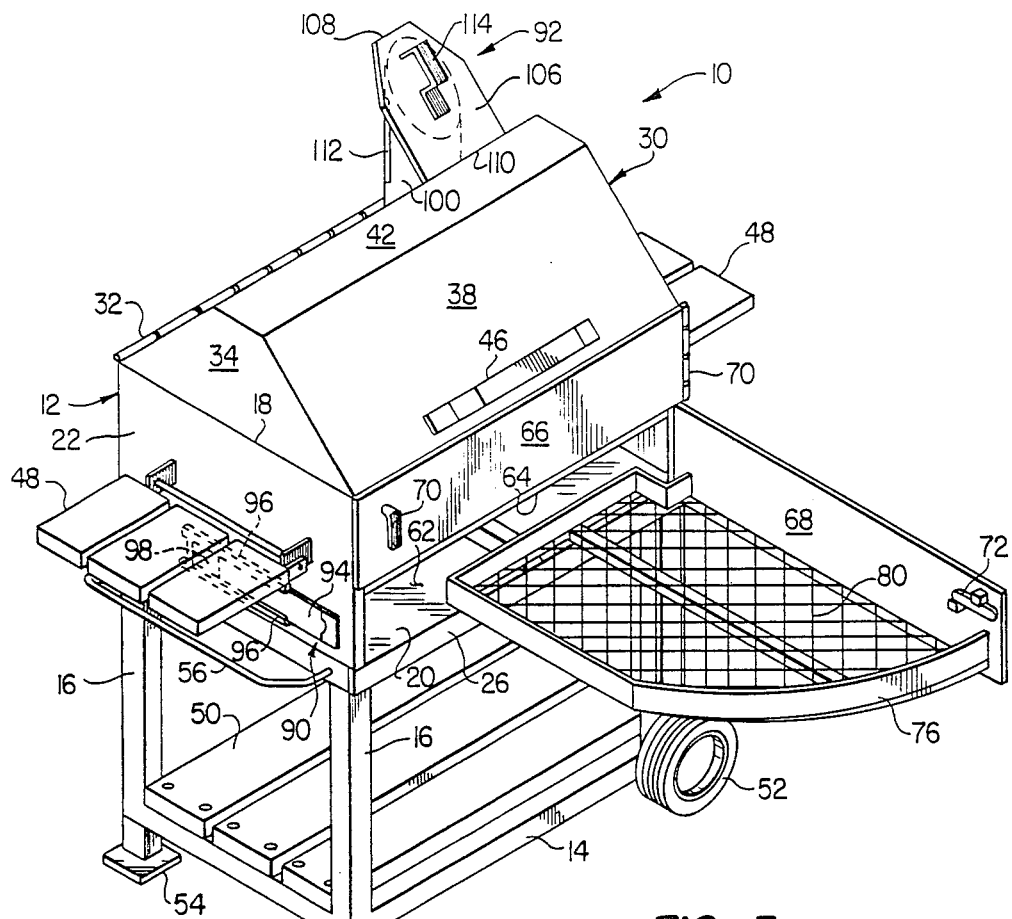
FIG. 3 is a view similar to that in FIG. 2, but with the upper grille door closed and a lower fuel grate-supporting door swung out to its open position.

Perspectively illustrated in FIGS. 1-4 of the drawings is a uniquely constructed solid fuel-burning outdoor barbecue grille 10 which embodies principles of the present invention. The grille includes a horizontally elongated rectangular metal housing 12 which is supported on a base frame 14, in an elevated relationship therewith, by support legs 16 extending downwardly from the lower corners of the housing and suitably anchored to the base frame 14. Housing 12 has an open top 18, a bottom or base wall 20, left and right end walls 22 and 24, and horizontally elongated front and rear side walls 26 and 28.

The open top 18 of the housing 12 may be selectively opened and closed by means of a metal lid structure 30 which is hinged, as at 32, along the upper edge of the rear housing side wall 28. Lid 30 has generally trapezoidally shaped left and right end walls 34 and 36, upwardly and inwardly sloped front and rear side walls 38 and 40, and a horizontally elongated rectangular upper side wall 42. As indicated by the double-ended arrow 44 in FIG. 1, lid 30 may be pivoted about the hinge 32 to cover and uncover the open top 18 of the housing 12. Pivoting of the lid in this manner is facilitated by a handle 46 suitably affixed to the front side wall 38 of the lid.

Figure 4:
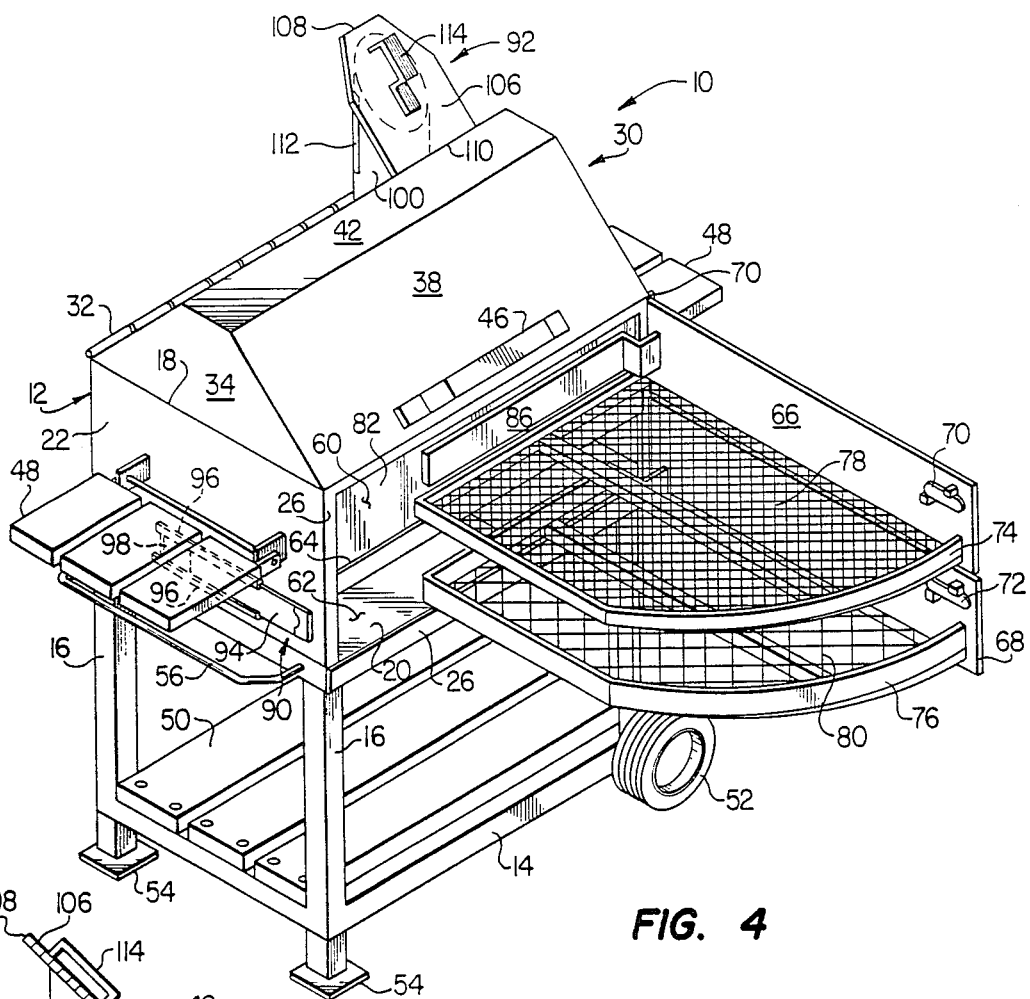
FIG. 4 is a view similar to that in FIGS. 2 and 3, but with both of the grille doors swung outwardly to their open positions.

Food and cooking equipment storage space is provided by means of a pair of drop-down shelf structures 48 pivotally mounted on the opposite housing end walls 22 and 24, each of the shelves 48 being movable between and upright stored position (FIG. 1) and a downwardly pivoted, horizontally extending use position (FIGS. 2-4). Additional food and cooking equipment storage space is provided by a lower shelf 50 secured to and extending across the base frame 14.

Secured to the right end of the base frame 14 are a pair of support wheels 52 (only one of which is visible), and at the left end of the base frame the support legs 16 are extended downwardly therefrom and secured to rectangular support plates 54 adapted to rest upon the ground and support the housing 12 in a horizontal position. The grille 10 may be easily rolled from place to place simply by lifting on a handle 56 secured to a lower portion of the left housing end wall 22 to elevate the support plates 54, and then pushing or pulling the grille 10 along the ground.

Figure 5:
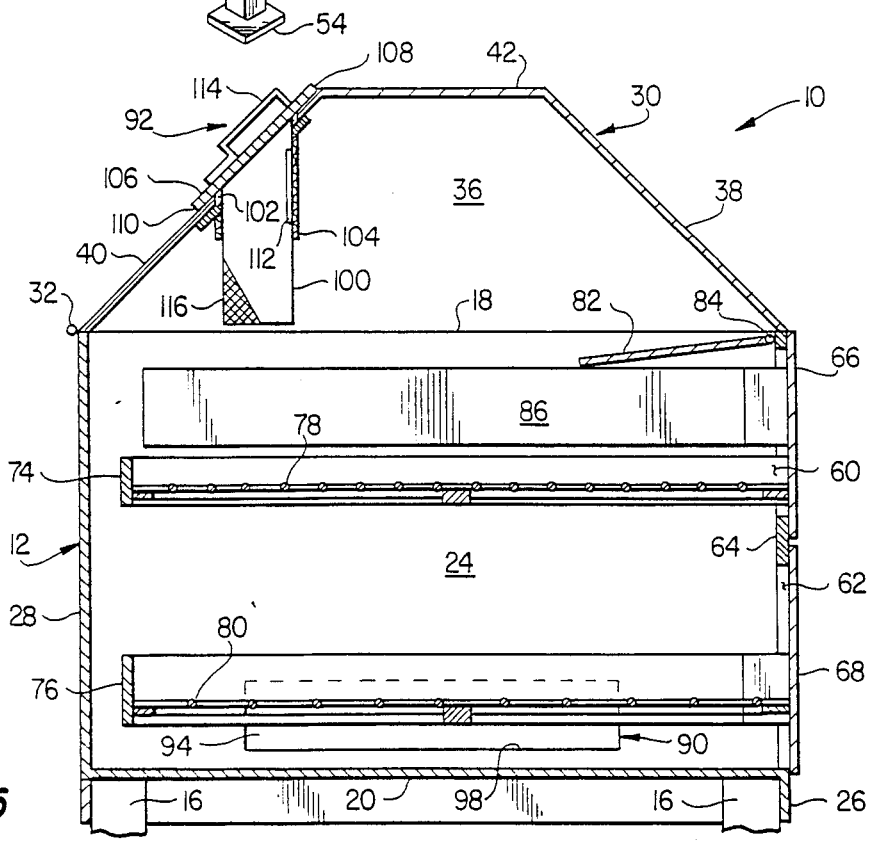
FIG. 5 is an enlarged scale cross-sectional view taken through the grille along line 5—5 of FIG. 1.
Figure 6:
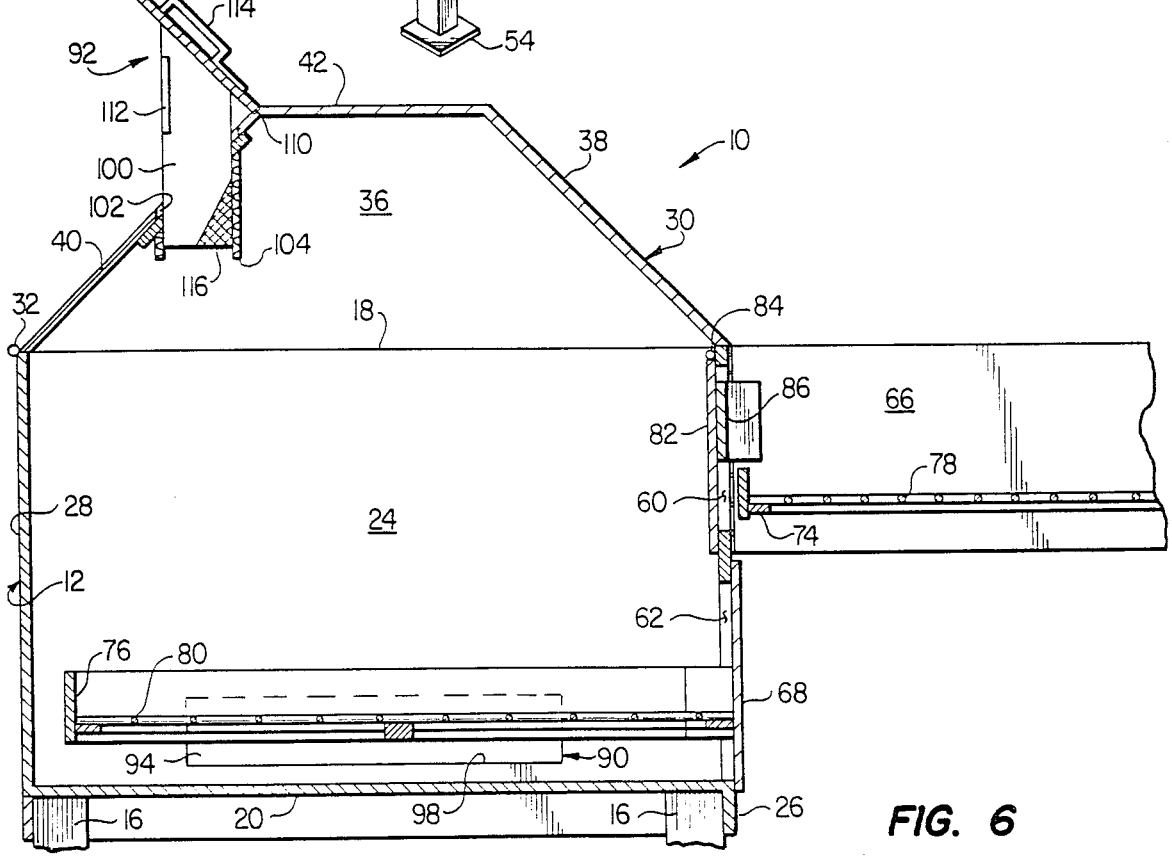
FIG. 6 is an enlarged scale cross-sectional view through the grille taken along line 6—6 of FIG. 2.

As best illustrated in FIG. 4, the front housing side wall 26 has a large rectangular opening formed therein which is divided into upper and lower horizontally elongated rectangular openings 60 and 62 by a horizontal cross member 64 (see also FIGS. 5 and 6). Horizontally elongated rectangular upper and lower doors 66 and 68 are secured to the right front corner of the housing 12 by hinges 70 and 72 and may be horizontally pivoted between closed positions (FIG. 1) in which the doors cover the housing side wall openings 60 and 62, and open positions (FIG. 4) in which the openings 60, 62 are uncovered. At their left ends, the upper and lower doors 66, 68 are provided with suitable latching handle structures 70 and 72 to hold the doors in their closed positions over the housing side wall openings 60 and 62.

Respectively secured to the inner side surfaces of the upper and lower doors 66 and 68 adjacent their lower side edges are horizontally disposed upper and lower support frame structures 74 and 76 which are configured to be swung inwardly through the housing side wall openings 60, 62 into the interior of housing 12 (see FIG. 5) when the doors 66, 68 are pivoted inwardly to their closed positions, and to be moved outwardly through the openings 60, 62 to a position spaced slightly forwardly of the housing when the doors 66, 68 are swung out to their fully open positions (see FIGS. 2-4). Respectively supported in the support frame structures 74 and 76 are a lift-out food-supporting grate 78 and a lift-out solid fuel-supporting grate 80. As best illustrated in FIG. 5, with the housing doors closed, the grate 80 is horizontally supported within the housing interior somewhat above the base wall 20, and the grate 78 is horizontally supported above the grate 80 and below the open top 18 of the housing which is covered by the lid 30.

To operate the grille 10, the lower housing door 68 is opened (FIG. 3) and a suitable quantity of charcoal or other solid fuel such as wood is positioned on the grate 80. The charcoal may be ignited on the swung-out grate 80 prior to closing the lower door 68, or the door 68 can be closed, the lid 30 and the upper door 66 opened, and the charcoal then ignited. When the charcoal is ready for cooking, the lid 30 is closed and, with the upper door 66 in its open position (FIG. 2) the food items to be cooked are suitably arranged on the upper grate 78. Heat from within the interior of the closed housing 12 is prevented from escaping outwardly through the upper housing side wall opening 60 by means of an elongated rectangular metal flap 82 which is hinged, as at 84, (FIGS. 5 and 6) to the interior surface of the front housing side wall 26 adjacent the top 18 of the housing 12. When the upper door 66 is opened, the flap 82 automatically drops down to cover the upper housing opening 60 (FIG. 6) and when the upper door 66 is closed, an elongated tab member 86 (FIGS. 2, 4 and 6) secured to the inner side surface of the door 66 adjacent its inner end engages the flap 86, pivots it inwardly and upwardly into the housing interior, and holds the flap in an open position as best depicted in FIG. 5.

During the cooking process, with the doors 66 and 68 closed and the grates 78, 80 positioned within the housing interior as shown in FIG. 5, combustion draft control through the interior of the housing is provided by a pair of inlet slide damper structures mounted on lower portions of the opposite end walls 22, 24 of the housing 12 beneath the shelves 48, and a popup vent flue structure 92 mounted on the lid 30. Each of the slide damper structures 90 includes an elongated rectangular slide damper element 94 slidably carried within opposed guide channels 96 over a rectangular draft inlet opening 98 formed in the housing end wall.

The flue structure 92 includes a tubular metal vent pipe 100 which is extended downwardly through a circular opening 102 formed in the rear lid side wall 40 adjacent its juncture with the lid walls 36 and 42. Vent pipe 100 is slidingly supported within the interior of the lid 30 by a tubular expanded metal support sleeve 104 which is secured to and extends downwardly from the interior surface of the rear lid side wall 40. The vent pipe 100 is vertically movable between a retracted position (FIG. 5) relative to the lid 30, and an upwardly extended use position shown in FIG. 6. The upper end of the pipe 100 is angled and has secured thereto a horizontally sloped closure plate 106 that projects outwardly beyond the upper end periphery of the pipe 100 and has upper and lower opposite side edges 108 and 110. In its vertically retracted position, the vent pipe 100 extends downwardly into the interior of the lid 30 (see FIG. 5), and the closure plate 106 is parallel to and engages the outer surface of the rear lid wall 40 with the upper side edge 108 of the closure plate pointed toward the upper lid wall 42. The pipe 100 has radially formed therethrough a side wall outlet opening 112 which, with the pipe in its retracted position, is disposed beneath the lid side wall 40 and faces forwardly. The closure plate 106 has secured thereto a small handle 114.

To move the vent pipe 100 from its inwardly telescoped position depicted in FIGS. 1 and 5 to its upwardly extended use position depicted in FIGS. 2, 3, 4 and 6, the handle 114 is grasped and pulled upwardly to raise the pipe 100, and the pipe is then turned 180° in either direction and then lowered to bring the lower side edge 110 of the closure plate 106 into engagement with the outer surface of the rear lid side wall 40. This engagement between the closure plate and the lid functions to support the vent pipe 100 in its upwardly extended operating position with its side wall outlet opening 112 being positioned above the lid sidewall 40 and facing rearwardly. During operation of the grille 10, combustion air is drawn horizontally inwardly through the housing end wall openings beneath the fuel supporting grate 80, flows upwardly through the charcoal thereon, passes into the pipe 100 through an expanded metal inlet portion 116 positioned on its lower end, arises upwardly through the pipe 100 and then is rearwardly discharged through the pipe outlet opening 112. To return the pipe 100 to its retracted position, the handle 114 is lifted, the pipe 100 is rotated 180°, and then dropped to its inwardly telescoped position depicted in FIG. 5.

The barbecue grille 10 provides a variety of advantages over conventional solid fuel-burning grilles. For example, since the air inlet openings 98 are formed in the vertical end walls 22, 24 of the housing 12, fuel ash does not fall through such inlet openings onto the ground. Instead, the resulting ash falls upon the interior surface of the housing base wall 20, thereby captively retaining essentially all of the ash conveniently within the housing beneath the fuel grate 80 for subsequent cleaning. Additionally, since the vent pipe outlet opening 112 faces horizontally (instead of upwardly), rain or sprinkler water entry therethrough into the housing is significantly reduced — even if the vent pipe is inadvertently left in its upwardly extended operative position after cooking is completed.

Also, as previously described, since the food grate 78 can be swung outwardly from the housing and away from the hot burning charcoal or other solid fuel therein, the cooking food items can be periodically turned and rearranged without subjecting the cook's hands to searing charcoal heat. Moreover, the housing lid 30 need not be lifted to turn or reposition the food on its support grate. Accordingly, fuel "flame up" is substantially eliminated.

Finally, when an extended cooking period (i.e., a period beyond that of the initial charcoal batch) is required, additional charcoal may be added to any selected section of the fuel grate 80, without moving the food grate 78, simply by opening the lower housing door 68 to provide complete, unimpeded access to the fuel grate 80 and the charcoal thereon.

The foregoing detailed description is to be clearly understood as being given by way of illustration and example only, the spirit and scope of the present invention being limited solely by the appended claims.

What is claimed is:

1. A barbecue grille comprising:
   a hollow housing structure having a vertically extending side wall portion with an opening extending horizontally therethrough;
   an upper door carried by said housing structure for horizontal movement relative thereto between a closed position in which said upper door covers an upper portion of said opening, and an open position in which said upper door is moved outwardly from said housing structure and uncovers said upper portion of said opening;
   a lower door carried by said housing structure for horizontal movement relative thereto between a closed position in which said lower door covers a lower portion of said opening, and an open position in which said lower door is moved outwardly from said housing structure and uncovers said lower portion of said opening;
   upper grate means for supporting food items to be cooked within said housing structure, said upper grate means being carried by said upper door for movement thereby into and out of the interior of said housing structure, through said upper portion of said opening, in response to the closing and opening, respectively, of said upper door;
   lower grate means for supporting solid fuel used to cook foot items supported within said housing structure on said upper grate means, said lower grate means being carried by said lower door for movement thereby into and out of the interior of said housing structure, through said lower portion of said opening, in response to the closing and opening, respectively, of said lower door,
   whereby, by opening said upper and lower doors, food items and solid fuel may be conveniently loaded and rearranged on said upper and lower grate means, respectively, while being supported thereby externally of said housing structure, and then moved into a relative cooking orientation, in which the food items supported on said upper grate means are positioned directly above burning fuel supported on said lower grate means within said housing structure to transfer cooking heat and products of combustion directly upwardly from the burning fuel to the supported food items, by closing said upper and lower doors.

2. The barbecue grille of claim 1 further comprising:
   closure means for closing said upper portion of said opening in response to the opening of said upper door to prevent the escape of cooking heat outwardly through said upper portion of said opening while said upper door is open.

3. The barbecue grille of claim 2 wherein:
   said closure means comprise a flap member carried within said housing structure for downward pivotal movement to cover said upper portion of said opening when said upper door is opened, and a tab member carried by said upper door and operative to engage, upwardly pivot and hold said flap member in an upwardly and inwardly pivoted position when said upper door is closed.

4. The barbecue grille of claim 3 wherein:
   said upper and lower doors are pivotally connected to said housing structure for movement relative thereto about vertical axes between said open and closed positions.

5. The barbecue grille of claim 4 wherein:
   said upper and lower grate means comprise lift-out grate structures removably carried by support frame means secured to inner side surfaces of said upper and lower doors.

6. A barbecue grille comprising:
   a hollow housing having an open upper end;
   a lid pivotally secured to said housing for movement relative thereto between closed and open position to respectively cover and uncover said open upper end of said housing;
   upper gate means positionable within said housing for supporting food items to be cooked therein;

lower grate means, positionable within said housing below said upper grate means, for supporting solid fuel used in cooking food items supported on said upper grate means;

air inlet means formed in said housing for admitting combustion air thereinto; and flue means, carried by said lid, for discharging combustion gas from within said housing through said lid when said lid is in said closed position, said flue means including:

an opening formed through said lid, a vent pipe having a closed upper end, a side wall gas outlet opening positioned adjacent said upper end, a lower end, and a gas inlet opening adjacent said lower end, said vent pipe, when said lid is in said closed position, being vertically movable through said lid opening between a closed position in which said vent pipe extends downwardly through said lid opening with said gas outlet opening positioned below said lid opening, and an open position in which said vent pipe extends upwardly from said lid with gas outlet opening positioned above said lid opening, and support means for releasably supporting said vent pipe in a selected one of said open and closed positions thereof, said lid, when in said closed position thereof, having an upwardly and horizontally inwardly sloped sidewall portion through which said lid opening is formed, said upper end of said vent pipe being sloped at an angle essentially equal to the slope angle of said side wall portion of said lid, and said support means comprising a sloping closure plate secured to and covering said upper end of said vent pipe and projecting laterally outwardly beyond said upper end of said vent pipe, said closure plate having opposite upper and lower side edges, whereby said vent pipe may be rotated to position said closure plate parallel to said side wall portion of said lid and then lowered to its closed position in which the underside of said closure plate engages the outer surface of said side wall portion of said lid and supports said vent pipe in its closed position, and said vent pipe may be lifted from its closed position, rotated 180°, and then lowered to cause said lower side edge of said closure plate to engage the outer surface of said side wall portion of said lid to support said vent pipe in its open position.

7. The barbecue grille of claim 6 wherein:
said gas inlet opening of said vent pipe is defined at least in part by a perforate sidewall section thereof adjacent its lower end.

8. The barbecue grille of claim 7 further comprising:
a perforated support collar secured to the inner surface of said side wall portion of said lid around said opening therein, extending axially inwardly from said lid opening, and supportingly receiving an axial portion of said vent pipe.

9. A solid fuel-burning barbeque grille comprising:
a hollow housing structure having a vertically extending side wall portion with an opening extending horizontally therethrough, and an open top;
a lid pivotally secured to said housing structure for movement relative thereto between closed end open positions in which said lid respectively covers and uncovers said open top of said housing structure, said lid having an upwardly and inwardly sloped side wall portion;

an upper door carried by said housing structure for horizontal movement relative thereto between a closed position in which said upper door covers an upper portion of said opening, and an open position in which said upper door is moved outwardly from said housing structure and uncovers said upper portion of said opening;

a lower door carried by said housing structure for horizontal movement relative thereto between a closed position in which said lower door covers a lower portion of said opening, and an open position in which said lower door is moved outwardly from said housing structure and uncovers said lower portion of said opening;

upper grate means for supporting food items to be cooked within said housing structure, said upper grate means being carried by said upper door for movement thereby into and out of the interior of said housing structure, through said upper portion of said opening, in response to the closing and opening, respectively, of said upper door;

lower gate means for supporting solid fuel used to cook food items supported within said housing structure on said upper grate means, said lower grate means being carried by said lower door for movement thereby into and out of the interior of said housing structure, through said lower portion of said opening, in response to the closing and opening, respectively, of said lower door, whereby, by opening said upper and lower doors, food items and solid fuel may be conveniently loaded and rearranged on said upper and lower grate means, respectively, while being supported thereby externally of said housing structure, and then moved into a relative cooking orientation, in which the food items supported on said upper grate means are positioned directly above burning fuel supported on said lower grate means within said housing structure to transfer cooking heat and products of combustion directly upwardly from the burning fuel to the supported food items, by closing said upper and lower doors;

air inlet means, formed in said side wall portion of said housing structure, for admitting a selectively variable quantity of combustion air into the interior of said housing structure during cooking therein, and flue means, carried by said lid, for discharging combustion gas from within said housing structure through said lid when said lid is closed, said flue means including:

an opening formed through said side wall portion of said lid, a vent pipe having a closed upper end, a side wall gas outlet opening positioned adjacent said upper end, a lower end, and a gas inlet opening adjacent said lower end, said vent pipe, when said lid is closed, by being vertically movable through said lid opening between a closed position in which said vent pipe extends downwardly through said lid opening with said gas outlet opening positioned inwardly of said lid opening, and an open position in which said vent pipe extends upwardly from said side wall portion of said lid with said gas outlet opening positioned outwardly of said lid opening, and support means for releasably supporting said vent pipe in a selected one of said open and closed positions thereof.

10. A solid fuel-burning barbecue grille comprising:
a hollow housing structure having a vertically extending side wall portion with an opening extending horizontally therethrough, and an open top;
a lid pivotally secured to said housing structure for movement relative thereto between closed and open positions in which said lid respectively covers and uncovers said open top of said housing structure, said lid having an upwardly and inwardly sloped side wall portion;
an upper door carried by said housing structure for horizontal movement relative thereto between a closed position in which said upper door covers an upper portion of said opening, and an open position in which said upper door is moved outwardly from said housing structure and uncovers said upper portion of said opening;
a lower door carried by said housing structure for horizontal movement relative thereto between a closed position in which said lower door covers a lower portion of said opening, and an open position in which said lower door is moved outwardly from said housing structure and uncovers said lower portion of said opening;
upper grate means for supporting foot items to be cooked within said housing structure, said upper grate means being carried by said upper door for movement thereby into and out of the interior of said housing structure, through said upper portion of said opening, in response to the closing and opening, respectively, of said upper door;
lower grate means for supporting solid fuel used to cook food items supported within said housing structure on said upper grate means, said lower grate means being carried by said lower door for movement thereby into and out of the interior of said housing structure, through said lower portion of said opening, in response to the closing and opening, respectively, of said lower door,
whereby, by opening said upper and lower doors, food items and solid fuel may be conventionally loaded and rearranged on said upper and lower grate means, respectively, while being supported thereby externally of said housing structure, and then moved into a relative cooking orientation, in which the food items are positioned above the fuel within said housing structure, by closing said upper and lower doors;
air inlet means, formed in said side wall portion of said housing structure, for admitting a selectively variable quantity of combustion air into the interior of said housing structure during cooking therein, and
flue means, carried by said lid, for discharging combustion gas from within said housing structure through said lid when said lid is closed, said flue means including:
an opening formed through said side wall portion of said lid,
a vent pipe having a closed upper end, a side wall gas outlet opening positioned adjacent said upper end, a lower end, and a gas inlet opening adjacent said lower end, said vent pipe, when said lid id closed, being vertically movable through said lid opening between a closed position in which said vent pipe extends downwardly through said lid opening with said gas outlet opening positioned inwardly of said lid opening, and an open position in which said vent pipe extends upwardly from said side wall portion of said lid with said gas outlet opening positioned outwardly of said lid opening, and
support means for releasably supporting said vent pipe in a selected one of said open and closed positions thereof,
said upper end of said vent pipe being sloped at an angle essential equal to the slope angle of said side wall portion of said lid, and
said support means comprising a sloping closure plate secured to and covering said upper end of said vent pipe and projecting laterally beyond its periphery, said closure plate having opposite upper and lower side edges,
whereby said vent pipe may be rotated to position said closure plate parallel to said side wall portion of said lid and then lowered to its closed position in which the underside of said closure plate engages the exterior surface of said side wall portion of said lid and supports said vent pipe in its closed position, and said vent pipe may be lifted from its closed position rotated 180°, and then lowered to cause said lower side edge of said closure plate to engage the exterior surface of said side wall portion of said lid to support said vent pipe in its open position.

11. The barbecue grille of claim 9 wherein:
said air inlet means include an air inlet opening formed through said side wall portion of said housing structure, and a slide damper member carried for sliding movement across said air inlet opening.

12. The barbeque grille of claim 9 further comprising:
a wheel-supported base frame, and
support leg means intersecured between said housing structure and said base frame for supporting said housing structure in an elevated position.

13. The barbeque grille of claim 12 further comprising:
shelf means, carried by said base frame, for supporting food, cooking equipment and the like.

14. The barbeque grille of claim 9 further comprising:
shelf means carried by said claim side wall portion of said housing structure, for supporting food, cooking equipment and the like.

15. The barbecue grille of claim 14 wherein:
said shelf means are pivotally carried by said side wall portion of said housing structure for movement between raised and lowered positions.

16. The barbeque grille of claim 9 further comprising:
closure means for closing said upper portion of said opening in said side wall portion of said housing structure in response to the opening of said upper door to prevent the escape of cooking heat outwardly through said upper portion of said opening while said upper door is open.

17. A solid fuel-burning barbeque grille comprising:
a hollow housing structure having a vertically extending side wall portion with an opening extending horizontally therethrough, and an open top;
a lid pivotally secured to said housing structure for movement relative thereto between closed and open positions in which said lid respectively covers and uncovers said open top of said housing structure, said lid having an upwardly and inwardly sloped side wall portion;

an upper door carried by said housing structure for horizontal movement relative thereto between a closed position in which said upper door covers an upper portion of said opening, and an open position in which said upper door is moved outwardly from said housing structure and uncovers said upper portion of said opening;

a lower door carried by said housing structure for horizontal movement relative thereto between a closed position in which said lower door covers a lower portion of said opening, and an open position in which said lower door is moved outwardly from said housing structure and uncovers said lower portion of said opening;

upper grate means for supporting food items to be cooked within said housing structure, said upper grate means being carried by said upper door for movement thereby into and out of the interior of said housing structure, through said upper portion of said opening, in response to the closing and opening, respectively, of said upper door;

lower grate means for supporting solid fuel used to cook food items supported within said housing structure on said upper grate means, said lower grate means being carried by said lower door for movement thereby into and out of the interior of said housing structure, through said lower portion of said opening, in response to the closing and opening, respectively, of said lower door, whereby, by opening said upper and lower doors, food items and solid fuel may be conveniently loaded and rearranged on said upper and lower grate means, respectively, while being supported thereby externally of said housing structure, and then moved into a relative cooking orientation, in which the food items are positioned above the fuel within said housing structure, by closing said upper and lower doors;

air inlet means, formed in said side wall portion of said housing structure, for admitting a selectively variable quantity of combustion air into the interior of said housing structure during cooking therein;

flue means, carried by said lid, for discharging combustion gas from within said housing structure through said lid when said lid is closed, said flue means including;

an opening formed through said side wall portion of said lid, a vent pipe having a closed upper end, a side wall gas outlet opening positioned adjacent said upper end, a lower end, and a gas inlet opening adjacent said lower end, said vent pipe, when said lid is closed, being vertically movable through said lid opening between a closed position in which said vent pipe extends downwardly through said lid opening with said gas outlet opening positioned inwardly of said lid opening, and an open position in which said vent pipe extends upwardly from said side wall portion of said lid with said gas outlet opening positioned outwardly of said lid opening;

support means for releasably supporting said vent pipe in a selected one of said open and closed positions thereof; and closure means for closing said upper portion of said opening in said side wall portion of said housing structure in response to the opening of said upper door to prevent the escape of cooking heat outwardly through said upper portion of said opening while said upper door is open, said closure means comprising a flap member carried within said housing structure for downward pivotal movement to cover said upper portion of said opening in said side wall portion of said housing structure when said upper door is opened, and a tab member carried by said upper door and operative to engage, upwardly pivot and hold said flap member in an upwardly and inwardly pivoted position when said upper door is closed.

18. The barbeque grille of claim 9 wherein:
said upper and lower doors are pivotally connected to said housing structure for movement relative thereto about vertical axes between said open and closed positions of said upper and lower doors.

19. The barbeque grille of claim 18 wherein:
said upper and lower grate means comprise lift-out grate structures removably carried by support frame means secured to inner side surfaces of said upper and lower doors.

* * * * *

UNITED STATES PATENT AND TRADEMARK OFFICE
CERTIFICATE OF CORRECTION

PATENT NO. : 4,862,792

DATED : September 5, 1989

INVENTOR(S) : Demetrio Lerma, Jr.

It is certified that error appears in the above-identified patent and that said Letters Patent is hereby corrected as shown below:

Title page:

In the Abstract, line 14, delete "When the upper door is closed, an interior tab member theaid vent pipe in a selected one of said open and closed positions thereof."

Col. 2, line 21, change "an" to --and--.

Col. 2, line 37, change "it" to --its--.

Col. 4, line 3, change "with" to --within--.

Col. 5, line 20, change "and upright" to --an upright--.

Col. 9, line 22 (Claim 7, line 25), between "with" and "gas", insert --said--.

Col. 9, line 66, "end" should be --and--.

Col. 10, line 24, "gate" should be --grate--.

Col. 10, line 60, after "closed," delete --by--.

Col. 11, line 28, "foot" should be --food--.

Col. 11, line 44, "conventionally" should be --conveniently--.

Col. 12, line 12, "essential" should be --essentially--.

Col. 12, line 26, after "position" insert --,--.

UNITED STATES PATENT AND TRADEMARK OFFICE
CERTIFICATE OF CORRECTION

PATENT NO. : 4,862,792

DATED : September 5, 1989

INVENTOR(S) : Demetrio Lerma, Jr.

It is certified that error appears in the above-identified patent and that said Letters Patent is hereby corrected as shown below:

Col. 12, line 12, "essential" should be --essentially--.

Col. 12, line 26, after "position" insert --,--.

Signed and Sealed this

Twenty-first Day of August, 1990

*Attest:*

HARRY F. MANBECK, JR.

*Attesting Officer*     *Commissioner of Patents and Trademarks*